J. F. SIMMANCE & J. ABADY.
VACUUM OR PRESSURE GAGE.
APPLICATION FILED JULY 26, 1910.

1,064,555.  Patented June 10, 1913.

Witnesses:
Henry C. Thieme
F. George Barry

Inventors:
John Frederick Simmance
and Jacques Abady
by their attorneys

UNITED STATES PATENT OFFICE.

JOHN F. SIMMANCE AND JACQUES ABADY, OF LONDON, ENGLAND.

VACUUM OR PRESSURE GAGE.

1,064,555.

Specification of Letters Patent.  Patented June 10, 1913.

Application filed July 26, 1910. Serial No. 573,829.

*To all whom it may concern:*

Be it known that we, JOHN FREDERICK SIMMANCE and JACQUES ABADY, subjects of Great Britain, residing, respectively, at 1 Westminster Palace Gardens, London, S. W., and Fountain Court, Temple, London, W. C., England, have invented certain new and useful Improvements in Vacuum or Pressure Gages, of which the following is a specification, reference being had therein to the accompanying drawings.

In many types of pressure or vacuum gages the pressure of a fluid is measured by the deformation produced on a flexible container into which the fluid is led. In such gages, e. g., in a Bourdon pressure gage, for high pressures, or in a vacuum or pressure gage of the aneroid barometer type for low pressures, one part of the flexible container is fixed to the base or framework of the instrument, and the movement of another part is transmitted to a hand moving over a dial, or to a pen marking upon a chart: the dial or chart having a suitably graduated scale, and the position of the said hand or pen indicating the pressure of the fluid. In many pressure gages equal increments of fluid pressure are not represented by equal movements of the hand over the dial, while the friction of the mechanism is often such that an appreciable lag of the hand is apparent as the pressure rises and falls.

Our present invention relates to the mechanism which transmits the movement or deformation of the flexible container to the hand or pen, and provides means for making equal divisions of the scale on the dial or chart to correspond with equal increments of pressure, means for adjusting or calibrating the instrument to correspond with the scale engraved on the dial or chart, means for setting the hand or pen so that the zero of the scale corresponds to zero or atmospheric pressure, and means for reducing to a minimum the friction of the mechanism so that there is no appreciable lag of the hand or pen as the pressure rises or falls.

Our invention also relates to the well known flexible box or "bellows diaphragm" used for low pressure gages, and provides a bellows diaphragm of sufficient strength and elasticity to resist the difference of pressure on its outside and inside surfaces, and capable of resisting chemical action by the particular gas or liquid for which the particular pressure or vacuum gage is designed.

Figure 1:
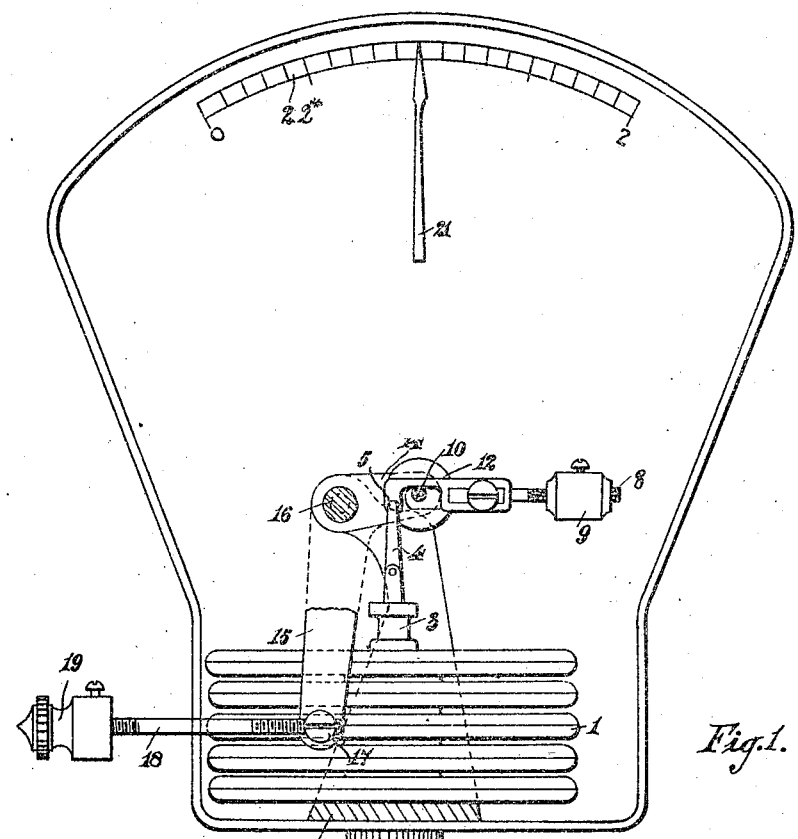
Figures 2, 3:
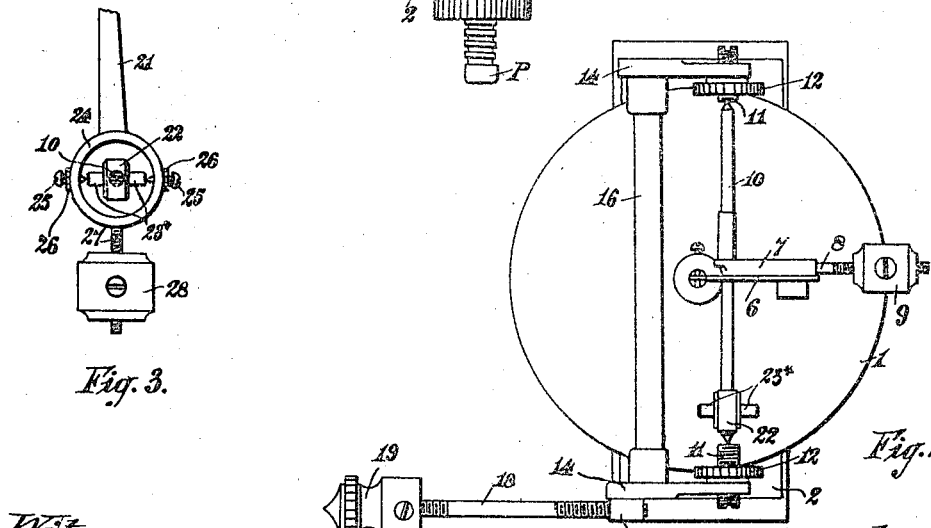

Figure 1 is an elevation partly in section and Fig. 2 is a plan showing our invention as applied to a barometer or to a vacuum or pressure gage for low pressure. Fig. 3 is a detail view illustrating the mode of securing the indicator hand to the spindle.

The forms of construction of the bellows diaphragm are well known. In one form, the box is made of a pair of circular disks corrugated concentrically, and soldered or otherwise fastened together at their peripheries. One of the disks is fastened at its center to a suitable block which serves to fasten it to the frame of the instrument and to give communication from the inside of the box by a pipe to the vessel containing the gas, the pressure of which is to be measured. Another form of box is made from several pairs of such disks each (with the exception of the last of the series) being pierced by a small central hole, the adjacent pairs being soldered or otherwise jointed together at the central holes. To give the necessary flexiblity the thickness of the disks must be very small. We find that when such pressure gages are used to measure the pressure of corrosive gases or liquids, the box made in the ordinary way is soon corroded away. This occurs in many cases with gas from flues or furnaces, the presence of sulfur, for example, being very detrimental to the metallic box. For making vacuum or pressure gages it has been proposed to use steel or copper diaphragms electroplated or otherwise coated with non-corrodible metal. It has also been proposed to use separate protective sheaths of copper or other non-corrodible metal in conjunction with steel diaphragms. Neither of the above methods form part of our invention, but on the contrary, we find that the electroplating of steel diaphragms affords insufficient protection against corrosive action in many cases.

Our invention consists, in, and is restricted to, the use of composite disks each made up of two sheets of metal united together by soldering or the like process.

In our invention we make each disk from two sheets of metal which are united together face to face, to form one composite corrugated disk. The outer sheet exposed to the atmosphere is of steel, copper, bronze, German silver, or other suitable material having the necessary strength and elasticity. The inner sheet, which is exposed to the gas or liquid may be of lead, tin, silver, gold, platinum or other suitable material selected not on account of its hardness, strength or elasticity, but solely on account of its properties in resisting chemical action by the particular gas or liquid for which the particular pressure or vacuum gage is designed.

In making our composite corrugated disks we may hold the sheets loosely and spin, stamp or press the concentric corrugations while the two sheets are separate from each other, then by heating to a suitable temperature and pressing them together, using if necessary a suitable soldering material, the two sheets are united to form one composite corrugated disk. Or, the two sheets may be united together when flat, and the corrugations may be spun, stamped or pressed on the composite disk.

The flexible container or bellows diaphragm 1 (Fig. 1) is fixed to the base plate 2 of the instrument, the fluid being admitted by the pipe P. If used as a barometer, the flexible container is exhausted of air and hermetically sealed, no pipe being required. The movement of the upper part 3 of the flexible container under varying pressures of the fluid is transmitted to the hand 21 as follows:— A link 4 adjustable in length by any well-known means has one end fixed to a piece 3 rigid with the top of the flexible container, and its other end is jointed at 5 to one end of a slotted bar 6 adjustable in position on a bar 7 integral with the spindle 10. Thus the radius at which the link 4 acts tending to rotate the spindle 10 can be adjusted. Integral with the piece 7 is a threaded wire 8 on which a counterweight 9 can be clamped in any desired position. The conical ends of the spindle 10 are mounted on the ends of adjustable set screws 11 carried by the levers 14, the set screws being clamped in position by the clamping nuts 12. The hand 21 is mounted on the spindle 10 and turns therewith, the details of the connection are described hereinafter. The end of the hand 21 swings over the graduated scale 23 engraved on the dial. For the purpose of adjusting the zero reading of the hand on the graduated scale to correspond exactly with zero or atmospheric pressure the distance of the spindle 10 from the base plate 2 is adjustable as follows:— The two levers 14 are integral with or fastened to a spindle 16 the ends of which are suitably mounted on bearings in the sides of the frame 2. One of the said levers 14 is a bell crank lever, the arm 15 projecting vertically downward from the spindle 16. Attached to the lower end of the arm 15 is a stud 17 which carries an adjusting screw 18 having a milled head 19 on the end which projects through the case of the instrument. The other end of the adjusting screw bears against the side of the frame 2. Thus, by turning the milled head 19, the screw 18 alters the distance of the stud 17 from the side of the frame 2. The bell crank lever 14, 15, is thus turned through a small angle about the axis of the spindle 16, and the position of the spindle 10 relative to the flexible diaphragm can be adjusted.

The hand 21 is suspended from and turns with the spindle 10. For this purpose a trunnion piece 22 with projecting trunnions 23* is clamped to the spindle 10. When used for a vacuum gage, the trunnion piece is clamped on the spindle in such a position that the zero or atmospheric pressure is shown at one end of the graduated scale, when used for a pressure gage, the trunnion piece is clamped in such a position that the zero or atmospheric pressure is at the other end of the scale. A ring 24 (Fig. 3) carries adjustable set screws 25, the conical ends of which engage with the ends of the trunnions 23*, and clamping nuts 26 retain the set screws 25 in position. The hand 21 is soldered to the ring 24. A threaded wire 27 is integrally fixed to the ring and an adjustable weight 28 is screwed thereon, and is clamped in position by a clamping screw. The hand 21 being set at a slight angle with the wire 27 by adjusting the position of the weight 28, the end of the hand 21 can be made to take up a position close to, but not touching the dial 22*.

Claims.

1. A vacuum or pressure gage comprising a flexible box or bellows diaphragm, a rotatable spindle, a hand mounted against rotation thereon, adjustable means for causing the expansion and contraction of the diaphragm to rotate the spindle, and means for adjusting the instrument to correspond exactly with the scale on the dial, the said means comprising a base, an arm fixed to and depending from the spindle, and means for varying the distance between the base and the arm.

2. A vacuum or pressure gage comprising a flexible box or bellows diaphragm, a base plate therefor, a rotatable spindle, a hand mounted against rotation thereon, adjustable means for causing the expansion and contraction of the diaphragm to rotate the spindle, and means for varying the distance between the spindle and the base plate for adjusting the instrument to correspond exactly with the scale on the dial.

In testimony whereof we affix our signatures in presence of two witnesses.

JNO. F. SIMMANCE.
JACQUES ABADY.

Witnesses:
CECIL ARTHUR GOODWIN,
JAMES FOREMAN.